United States Patent Office 2,738,299
Patented Mar. 13, 1956

2,738,299

STABLE NUTRITIVE AMINO ACID COMPOSITIONS

Douglas V. Frost and Floyd C. McIntire, Waukegan, Ill., assignors to Abbott Laboratories, North Chicago, Ill., a corporation of Illinois No Drawing. Application May 11, 1953,
Serial No. 354,374

11 Claims. (Cl. 167—65)

The present application is a continuation-in-part of application Serial No. 100,954, filed June 23, 1949, which is a continuation-in-part of application Serial No. 672,158, filed May 24, 1946, which in turn is a continuation of application Serial No. 597,374, filed June 2, 1945, all now abandoned. This invention relates to stabilized nutritive compositions suitable for intravenous administration.

It has been established by a great number of investigators that a nitrogen balance should be maintained in post-operative patients and others who have dietary deficiencies. Elman, Bull. N. Y. Acad. Med. 20: 220–236 (April 1944); Shohl et al., J. of Nutrition 20, 4; 305 (October 1940); and editorial, J. Am. Med. Assn. 838–839 (March 1, 1941), to mention but a few of the investigators, have established the value of amino acid therapy. The investigations were concerned with the clinical results of administration of pure synthetic amino acid compositions and protein hydrolysates. Attempts to prepare a stable protein hydrolysate-dextrose composition were singularly unsuccessful. It was found that the amino acid and dextrose compositions could be mixed only immediately prior to administration, and that sterilization by filtration (using a very fine filter) was the only means of sterilization which could be used. Alternatively, the amino acid and dextrose compositions were administered from separate containers through a Y tube. It was early found that heat sterilization could not be used on the compositions, and the unsatisfactory filter sterilization had to be used.

Ordinarily where amino acid therapy is indicated, there is also a need for carbohydrate therapy to supply the indispensable calorific value. By supplying the amino acid composition in conjunction with the dextrose solution through a Y tube, there is generally too much liquid being administered to the patient. To overcome this excessive fluid, the amino acid solution was mixed with a concentrated dextrose solution, immediately prior to injection and the mixed solution sterilized by filtration. Such sterilization by filtration is not reliable, and is not preferred by the medical profession. Prior to our invention it has not been possible to produce a composition which satisfies the requirements of the medical profession.

A nitrogen balance may be maintained using pure amino acid compositions which contain sufficient amounts of the so called essential amino acids. However, it is economically impracticable to supply the demand by using the pure amino acid. Direct hydrolysis of proteins of high biological value under conditions in which a large part of all of the essential amino acids present are retained in free form or in available peptide form, offers a more economical method for preparation of solutions of amino acids for intravenous use, see Elman, Annals of Surgery, 594–602 (October 1940).

The highly complex nature of proteins and also of protein hydrolysates containing protein forming amino acids involves many difficult problems for the manufacturer. Chief among these is the fact that the protein hydrolysates as ordinarily prepared are unstable and undergo deleterious changes under various conditions of preparation and storage, such as heating, cooling and ageing. The changes are much more pronounced when carbohydrates such as dextrose are present. Deleterious effects are evidenced by the color changes in the solution and by the formation of precipitates. The presence of precipitates makes the compositions unfit for use. Furthermore, the highly colored compounds which ordinarily form when protein hydrolysates and dextrose are heated together have been shown to exert toxic effects on injection into animals.

It is known that some amino acids react with reducing sugars, such as dextrose and the like, but the reaction is not understood. Also very little is known about the decomposition of amino acids in solution. The reaction of amino acids with aldehydes and reducing sugars produces dark colored nitrogen compounds known as humins or melanoids. These complex, high-molecular weight materials precipitate as the reaction proceeds. Barnes et al., Ind. Eng. Chem. 39, 1176 (1947) investigated the reaction in food-stuffs, and they report that the velocity of the reaction depends on the nitrogen compound and carbohydrate used, conditions of concentration, temperature, pH and the time of heating. Numerous researchers have studied the reaction and it is notable that the reaction is not primarily an oxidation, but rather it is a complex condensation reaction of reducing sugars and other aldehydes with amino acids.

Agren, Enzymologia, 9, 321–328 (1941) experimented with many amino acids and glucose, and he found that the reaction is between the amino groups of the amino acids and the aldehyde groups of the glucose. Agren also shows that the reaction is greatly increased with a rise in temperature.

Kade, C. F., Drug and Cosmetic Industry, p. 723 (May 1947) also points out difficulties of heat sterilizing amino acids. He says, "a parfenteral product must be sterile. Sterility is usually accomplished by ultrafiltration. Since heat greatly increases the combination and destruction of amino acids, especially in a combination with aldehydes, such as glucose, it ordinarily is not used for sterilization."

It is known that under commercial operations protein hydrolysates contain substantially no cysteine. Cysteine, per se, is very unstable, and any small amounts that may be formed initially are for the most part rapidly destroyed during the hydrolysis (Halwer et al., J. Biol. Chem., vol. 166, 521 (1946)), or even spontaneously in contact with air (Matheus et al., J. Biol. Chem., vol. 6, 21 (1909)).

The present invention provides stable nutritive compositions suitable for intravenous administration comprising mixtures of protein hydrolysates with dextrose (d-glucose), fructose, or invert sugar (a combination of dextrose and fructose) and a stabilizing agent as hereinafter described. The stabilized compositions produced by our invention are clear, light colored solutions. These solutions may be sterilized by heating without significant decoloration, decomposition of the product, loss of nutritive value, or generation of toxic compounds. Similar compositions which do not contain the stabilizing agent become unsuitable upon heat sterilization or ageing.

In carrying out our invention, a proteolytic composition is obtained from the desired protein by hydrolysis. Such hydrolysis may be accomplished by any general hydrolyzing method, such as, enzymatic hydrolysis, acid hydrolysis or alkali hydrolysis; see Sahyun, Outline of the Amino Acids, and Proteins, chap. IV, Reinhold Publishing Corp. (1944). We prefer, however, to use the sulfuric acid hydrolysis of proteins and we prefer to use beef blood fibrin for the protein matter.

The hydrolysis in the preferred form is carried out by heating the fibrin with an aqueous solution of sulfuric acid, and the reaction is run at about reflux temperature. At the completion of the hydrolysis the sulfate is removed by barium hydroxide, and the solution is filtered. The clarified solution is diluted to the desired concentration; in the preferred embodiment the concentration is adjusted to 3–15% weight by volume of the protein hydrolysate.

The term "a sulfite," as used herein to designate a stabilizing agent of the invention, is intended to include all of the commonly known alkali sulfite substances such as the sulfites, the hydrosulfites, the bisulfites, the metabisulfites and the like. Specifically included are the alkali metal salts of sulfites, including the sodium and potassium salts. Other alkali salts such as the ammonium salts are also included. The alkali metal formaldehyde sulfoxylates are also suitable for use in the invention and are intended to be included within the terms "a sulfite" and "alkali sulfite." Sodium formaldehyde sulfoxylate is also called formaldehyde hydrosulfite.

While the sulfite may be used alone in this invention, we also contemplate the employment of the combination of a sulfite with an aliphatic water soluble aminothiol compound. The latter compounds are those containing an amino group and a mercapto group and include such compounds as the acid addition salts of cysteine (such as cysteine hydrochloride, etc.). Other compounds of this type are the acid addition salts of homocysteine such as homocysteine hydrochloride, and β-mercaptoethylamine hydrochloride. The commercially available form of cysteine is the hydrochloride salt which does not exist per se in a protein hydrolystate.

It is recognized that aldehydes (acetaldehydes, pyruvic aldehyde, phenylacetaldehyde, etc.) are always present in small amounts in acid protein hydrolysates. The aldehydes condense with amino acids liberated during the hydrolysis to form Schiff bases, which in turn decompose to form other highly reactive carbonyl compounds (Wieland, H., et al., Ann., 513, 203 (1934)). In the presence of the aldehydes and dextrose or reducing sugars, the amino acid tryptophan is particularly susceptible to the destructive reactions with the formation of toxic materials and human-like precipitates (Pharm. Jour., 157, 150 (1946)).

The stabilizing compositions reduce the measured electrode potential in the solutions of the type contemplated to below +0.200 volts. Solutions of hydrolysates which have a potential below +0.200 volts are stable, and for solutions of hydrolysates with dextrose added, the potential should not be more than +0.200 volts for 5% dextrose, and not more than +0.100 volts for 10% dextrose. We prefer, however, to keep the reduction potential below +0.100 volts for all fibrin hydrolysates. This potential ($E_h$) represents the electrode potential resulting from the potential difference across the interface existing between the platinum electrode and the cell solution (in this case fibrin hydrolysate). The ($E_h$) is defined by its measured potential of the cell chain as follows:

$$E_h = E_c + E_r$$

where $E_c$ represents the measured cell chain potential and $E_r$ is the potential of the reference electrode. The reference electrode is a saturated calomel half-cell, having a potential of +0.244 volts at 25° C.

The $E_h$ necessary to form a stable solution varies with the temperature, the pH, and the type of hydrolysate solution used. Obviously, therefore, the optimum amount of stabilizing agent will vary with the temperature, pH, and the type of protein hydrolysate.

In more specific detail the following examples will serve to illustrate the invention but without, however, limiting the invention in any way.

*Example I*

To a clarified 5% (w./v.) solution of hydrolyzed fibrin is added about 5% (w./v.) dextrose, about 0.03% (w./v.) sodium hydrosulfite, and about 0.1% (w./v.) cysteine hydrochloride. The solution is mixed, filtered, bottled and sterilized by autoclaving for about 20 minutes at 10 lbs. (gauge) steam pressure. The solution remains clear, light colored and stable upon heat sterilization and prolonged ageing.

*Example II*

To a clarified 5% (w./v.) solution of hydrolyzed fibrin is added about 5% (w./v.) dextrose, about 0.1% (w./v.) sodium sulfite, and about 0.5% (w./v.) cysteine hydrochloride. The solution is thoroughly mixed, filtered and bottled. The bottled solution is heat sterilized, and is then ready for use. The solution does not darken and does not lose nutritive value even after heat sterilization and prolonged ageing.

*Example III*

To a clarified 5% (w./v.) solution of hydrolyzed fibrin is added about 10% (w./v.) fructose, about 0.05% (w./v.) sodium hydrosulfite and about 0.03% (w./v.) cysteine hydrochloride. The solution is thoroughly mixed, filtered and bottled. It is then heat sterilized in an autoclave for about 20 minutes at 10 pounds (gauge) steam pressure. No color developed after heat sterilization and prolonged ageing.

*Example IV*

To a clarified 5% (w./v.) solution of hydrolyzed fibrin is added about 2.5% (w./v.) dextrose, about 2.5% (w./v.) fructose (the two sugars preferably being added in the form of invert sugar) and about 0.03% (w./v.) sodium hydrosulfite. The solution is thoroughly mixed, filtered and bottled and the bottled solution is heat sterilized.

*Example V*

To a clarified 5% (w./v.) solution of hydrolyzed fibrin is added about 5% (w./v.) dextrose and about 0.1% (w./v.) sodium formaldehyde sulfoxylate. The solution is thoroughly mixed, filtered and bottled and the bottled solution is heat sterilized.

*Example VI*

To a clarified 5% (w./v.) solution of hydrolyzed fibrin is added about 10% (w./v.) dextrose, about 0.1% (w./v.) potassium formaldehyde sulfoxylate and about 0.03% (w./v.) of cysteine hydrochloride. The solution is mixed, filtered, bottled and heat sterilized.

*Example VII*

To a clarified 5% (w./v.) solution of hydrolyzed fibrin is added about 5% (w./v.) dextrose, about 5% (w./v.) ethyl alcohol, about 0.02% (w./v.) sodium hydrosulfite and about 0.03% (w./v.) cysteine hydrochloride. The solution is thoroughly mixed, filtered and bottled and the bottled solution is heat sterilized.

*Example VIII*

To a clarified 5% (w./v.) solution of hydrolyzed fibrin is added about 5% (w./v.) of dextrose, and about 0.05% (w./v.) sodium bisulfite. The solution is thoroughly mixed, filtered and bottled, and the bottled solution is heat sterilized. The solution retains its clear, light appearance and its nutritive value even after heat sterilization and considerable ageing under normal shelf conditions.

None of the solutions prepared according to the foregoing examples undergo any substantial darkening or change in color when heat sterilized and subjected to normal shelf conditions. In control solutions similar to the solutions of the examples, but leaving out the stabilizing agent, the solutions became highly colored and unsuitable for use under similar conditions. Experiments have shown that the absence of color formation is an indication that the nutritive value of the solution has not been lowered.

Dextrose, fructose, or a combination (invert sugar)

may be used in amounts of about 3–15% (w./v.). The protein hydrolysate, made up chiefly of nutritive amino acids, is used in concentrations of about 3–15% or more suitably in concentrations of 5–10%. The amount of sulfite or alkali sulfite stabilizing agent which may be used is 0.01–0.20% (w./v.). When the amino-thiol compound is added with the sulfite it is desirable to add between 0.01% and 0.5% (w./v.), or suitably between about 0.02% and 0.1%.

Certain other compounds may be used in the solution with no deleterious effects, for instance, certain vitamins, sodium chloride, alcohol, inorganic salts commonly supplied in intravenous medication, and the like.

The protein which is hydrolyzed may be any of the proteins commonly used in the art. One may also use pure synthetic amino acids, or use the pure amino acids to supplement a protein hydrolysate. Any such amino acid solution may be stabilized by our invention, when used with or without a carbohydrate supplement (namely sugars).

Others may readily adapt our invention for use under various conditions of service, and any modification of or variation therefrom which conforms to the spirit of the invention is intended to be included within the scope of the claims.

We claim:

1. A composition suitable for intravenous administration containing as essential ingredients a dilute aqueous solution of about 3–15% of a protein hydrolysate made up of nutritive amino acids, about 3–15% of dextrose, about 0.01–0.20% of an alkali sulfite and about 0.01–0.5% of an aliphatic water soluble low molecular weight amino thiol compound selected from the group consisting of cysteine hydrochloride and homocysteine hydrochloride.

2. A composition suitable for intravenous administration containing as essential ingredients a dilute aqueous solution of about 5% of a protein hydrolysate made up of nutritive amino acids, about 5% of dextrose, about 0.01–0.20% of an alkali sulfite and 0.01–0.5% of a compound selected from the group consisting of cysteine hydrochloride and homocysteine hydrochloride.

3. A composition suitable for intravenous administration containing as essential ingredients a dilute aqueous solution of about 3–10% of a protein hydrolysate made up of nutritive amino acids, about 3–15% of a sugar from the group consisting of dextrose, fructose and mixtures thereof, and about 0.01–0.20% of an alkali sulfite.

4. The composition of claim 3 in which the alkali sulfite is sodium sulfite.

5. The composition of claim 3 in which the alkali sulfite is sodium hydrosulfite.

6. The composition of claim 3 in which the alkali sulfite is sodium bisulfite.

7. The composition of claim 3 in which the alkali sulfite is formaldehyde hydrosulfite.

8. The composition of claim 3 in which the sugar is dextrose.

9. The composition of claim 3 in which the sugar is fructose.

10. The composition of claim 3 in which the sugar is invert sugar.

11. A composition suitable for intravenous administration containing as essential ingredients a dilute aqueous solution of about 3–10% of a protein hydrolysate made up of nutritive amino acids, about 3–15% of a sugar from the group consisting of dextrose, fructose and mixtures thereof, about 0.01–0.20% of an alkali sulfite and about 0.01–0.2% of an aliphatic water soluble low molecular weight amino-thiol compound selected from the group consisting of cysteine hydrochloride and homocysteine hydrochloride.

References Cited in the file of this patent

UNITED STATES PATENTS

| Number | Name | Date |
|---|---|---|
| 1,087,547 | Nonnet | Feb. 17, 1914 |
| 2,123,928 | Bousquet | July 19, 1938 |
| 2,180,262 | Sturm | Nov. 14, 1939 |
| 2,180,637 | Kemmerer | Nov. 21, 1939 |
| 2,283,817 | Martin et al. | May 19, 1942 |
| 2,370,266 | Smith et al. | Feb. 27, 1945 |
| 2,442,044 | Moos | May 25, 1948 |

FOREIGN PATENTS

| Number | Country | Date |
|---|---|---|
| 475,291 | Great Britain | Nov. 17, 1937 |
| 3,381 | Austria | Feb. 11, 1901 |
| 552,285 | Great Britain | Mar. 31, 1943 |

OTHER REFERENCES

Science, vol. 98, No. 2554, p. 518, December 10, 1943.
Pyle et al.: Chem. Abstracts, vol. 37 (1943), p. 5699.
Agren: Chem. Abstracts, vol. 36 (1942), p. 79.